2,803,667
Patented Aug. 20, 1957

2,803,667
PRODUCTION OF ALCOHOLS AND ETHERS

Robert R. Chambers, Park Forest, Ill., assignor to Sinclair Refining Company, New York, N. Y., a corporation of Maine No Drawing. Application June 10, 1955,
Serial No. 514,737

2 Claims. (Cl. 260—614)

This invention relates to the hydration of mono-olefins. More particularly, the present invention is concerned with the hydration of $C_2$ to $C_4$ mono-olefins in the presence of hydrogen ion exchange resins to obtain the oxygen-containing products, ethers, alcohols or their mixtures in which conversion of the olefins is enhanced with a more selective yield to alcohol by adding ammonia to the reaction system.

It is known that low molecular weight mono-olefins can be converted to the corresponding alcohols and ethers by contact with water in the presence of various catalytic materials. The reaction products, which may contain predominantly alcohol or ether and, usually, at least a small portion of each as well as various amounts of olefin polymer, are particularly useful as gasoline blending agents to obtain fuels of higher octane rating. Common sources of the olefin feed for the hydration reaction are the relatively pure olefin materials and mixed streams such as the petroleum refinery streams containing propylene and buylenes, both normal and isobutylene, and a substantial amount of $C_3$ or $C_4$ paraffins. A particular stream which can be employed in the hydration reaction contains from about 50 to 75 volume percent of propylene with the remaining being substantially propane. In the hydration reaction various solid catalysts are effective and can be disposed in a fixed bed or employed in slurry form either on a batch or continuous basis. In this reaction system the water and olefin can be present as liquid or vapors depending upon the particular reaction conditions employed.

The present invention is concerned with the $C_2$ to $C_4$ mono-olefin hydration reaction systems in which the catalyst is a sulfonated hydrogen ion exchange resin and the water for hydration is present in either the liquid or vapor phase depending upon reaction conditions used. In the present invention the effectiveness of the hydration reaction is improved and the selectivity in producing alcohol is increased by employing small amounts of ammonia in the reaction system, e. g., by supplying ammonia in the water or olefin feed streams. The ammonia can be used in aqueous or anhydrous form and will usually comprise from about 0.1 to 10 weight percent based on the water in the reaction zone.

Among the catalysts employed in this invention are the hydrogen ion exchange resins which are relatively high molecular weight, water-insoluble materials containing a plurality of one or more functional groups such as sulfonic acid, hydroxy or carboxyl. The resins include for example aromatics such as sulfonated coals, sulfonated phenol formaldehyde resins, sulfonated courmarone-indene polymers, sulfonated polymers of cyclopentadiene and furfural. Other useful resins are sulfonated aliphatics such as sulfonated polyethylene and resins such as materials derived from sulfonation petroleum residuals. The sulfuric acid sludges from lube oil treating or olefin alkylation processes are also useful. When employing these sludges in the reaction system, they are heated at a temperature sufficient to render the material substantially water-insoluble. These various exchange resins can be combined before polymerization with cross-linking agents such as cyclopentadiene, furfural and divinyl benzene.

In the hydration of the $C_2$ to $C_4$ mono-olefins the product contains alcohol, ether or both and it is known that the selection of reaction conditions controls the relative amounts of the components produced. When employing the hydrogen ion exchange resins as catalysts the reaction temperatures will generally vary between about 50 and 175° C. with pressure being within the range from about 15 to 3000 p. s. i. g. or more. In the hydration reaction space velocities of about 0.1 to 5 WHSV (weight of olefin per weight of catalyst per hour) are generally used. In any event the catalyst is present in an amount sufficient to exhibit a substantial catalytic effect.

The reaction condition which has the most effect upon the distribution of ether and alcohol in the product of the mono-olefin hydration reaction is the water to olefin ratio. For increased alcohol formation the molar ratio of water to olefin is at least 1 to 1 with increased amounts of water assuring a larger formation of alcohol. When ether formation is to be increased, the molar ratio of water to olefin is decreased and in particular is less than 0.5 to 1 and can be as low as 0.1 to 1 or less.

As an example of this invention a downflow adiabatic reactor is charged with 100 lbs. of 14 to 20 mesh hydrogen ion exchange resin Amberlite IR–120(H), a sulfonated copolymer of styrene and divinyl benzene, a mixed propane-propylene feed containing about 70 volume percent of propylene is mixed with water and preheated to 300° F. The feed rate of the propane-propylene stream is about 105 lbs. per hour with the feed rate of the water stream being about 110 lbs. per hour. The resulting mixture is combined with aqueous ammonia containing sufficient ammonia to provide 1 weight percent of $NH_3$ based on the total water in the mixture. The resulting mixture is pumped to the reaction zone containing the Amberlite resin and maintained at a pressure of 1000 p. s. i. g. The effluent product from the reaction zone contains isopropyl alcohol, isopropyl ether, unreacted olefin, olefin polymer and water. In this system should ammonia continue to build up it may be desirable to stop the reaction periodically for a steam purge.

It is claimed:

1. The method of converting mono-olefin containing 2 to 4 carbon atoms to alcohols and ethers which comprises hydrating olefin with water while in contact with a catalytic amount of sulfonated hydrogen ion exchange resin and with a sufficient amount of ammonia passing to the reaction zone to enhance olefin conversion said amount of ammonia being from about 0.1 to 10 weight percent of water in the reaction zone.

2. The method of claim 1 in which the olefin is propylene.

References Cited in the file of this patent

UNITED STATES PATENTS

| | | |
|---|---|---|
| 2,036,317 | Bent et al. | Apr. 7, 1936 |
| 2,477,380 | Kreps et al. | July 26, 1949 |
| 2,632,026 | Conner | Mar. 17, 1953 |